R. W. LOWE.
METHOD OF MAKING TUBES.
APPLICATION FILED OCT. 12, 1920.
1,370,328.
Patented Mar. 1, 1921.
2 SHEETS—SHEET 2.
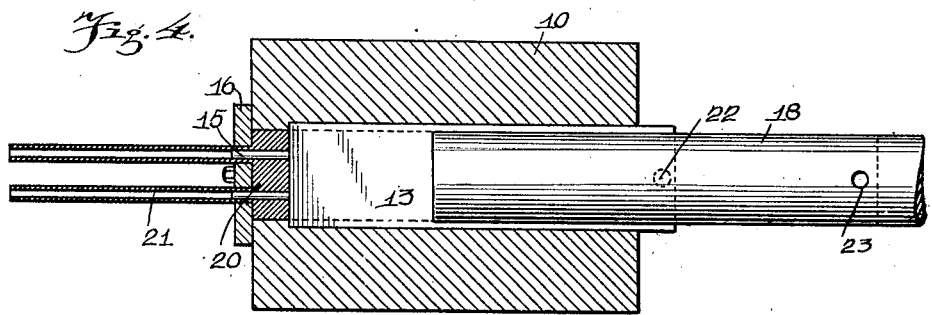
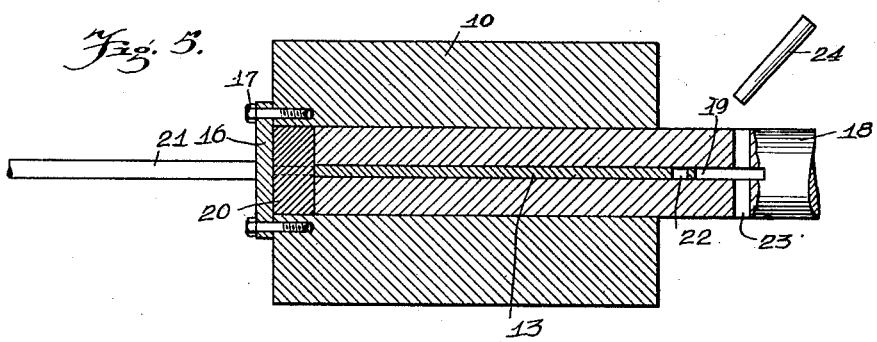
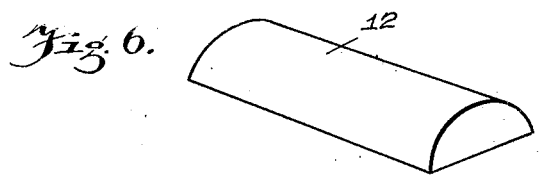
WITNESSES
INVENTOR
RAY W. LOWE.
BY
ATTORNEYS

UNITED STATES PATENT OFFICE.

RAY WALTER LOWE, OF WATERBURY, CONNECTICUT.

METHOD OF MAKING TUBES.

1,370,328.  Specification of Letters Patent.  Patented Mar. 1, 1921.

Application filed October 12, 1920. Serial No. 416,457.

*To all whom it may concern:*

Be it known that I, RAY WALTER LOWE, a citizen of the United States, and resident of Waterbury, in the county of New Haven and State of Connecticut, have invented a new and Improved Method of Making Tubes, of which the following is a full, clear, and exact description.

One of the most advanced methods in connection with the extrusion of tubes is that in which a container is provided, which container is formed with a bore, and in which a billet is positioned, which billet is heated to approximately 1400° Fahrenheit, subsequent to which the same is subjected to a great pressure exerted by a hydraulic ram, which is introduced into one end of the bar.

Positioned at the opposite end of the bore is a die through which the pin, secured to the ram projects, this pin naturally extending also through the billet. Upon the ram being operated, the pin carried thereby is slowly projected through the die, and the end of the ram acting as a piston, forces or extrudes the billet between the pin and die, resulting in the forming of a tube.

Numerous other methods have been resorted to, but this method is cited as being in line with the latest advances in the art.

A number of difficulties have been found to exist in connection with this method, the most paramount of which are to be found in that, Primarily, the pin was liable to stresses, resulting in the same moving out of its alined position with respect to the die in which event, the walls of the tube would be eccentric, or in other words, uneven, which is to be guarded against.

Secondly, if the pin were bent out of alinement, the operations of the ram would necessarily have to cease until the pin could be straightened. Aside from this a great amount of delay was experienced in connection with the adhering of a certain amount of the billet which was not extruded to the ram and pin, which would result in a further delay of operations until these parts could be thoroughly cleaned, obviously causing an expenditure of a great amount of unnecessary time and consequential expense.

Also billets used, were circular in cross section, and it has been often found that billets of this type present a core which is defective. Consequently the tubes extruded from this member were faulty, and where billets including a plurality of units have been used, a great amount of tubing formed by these billets has been unmarketable, in that the seams appeared in the tubes, due to the fact that the billet was of more than one part, the defect of these tubes resulting from the abutting edges of the billets.

Numerous other defects of a minor and major nature were to be noted in connection with these and other methods of extruding resorted to, such defects being extremely numerous and resulting in the increase of expense incident to the finishing of the tube.

Having these defects in mind, I have invented a method of making tubes which will primarily overcome the objections incident to the centering of the pin with respect to the die.

A further object of my invention is the provision of a method of making tubes in which a clogging and bending of the parts will be eliminated, and the delay incident to the cleaning of the same will consequently be avoided.

A still further object of my invention is the provision of a method of making tubes by means of which the objection incident to the utilization of the billet which is circular in cross section, is avoided.

Further objects of my invention will be found in the annexed specification and drawings, which latter present one practical embodiment of my invention, and in which—

Fig. 4 is a sectional plan view showing the parts in operation.

Fig. 5 is a sectional side view of the same, and

Fig. 6 is a perspective view of one of the billets used.

Figure 1:
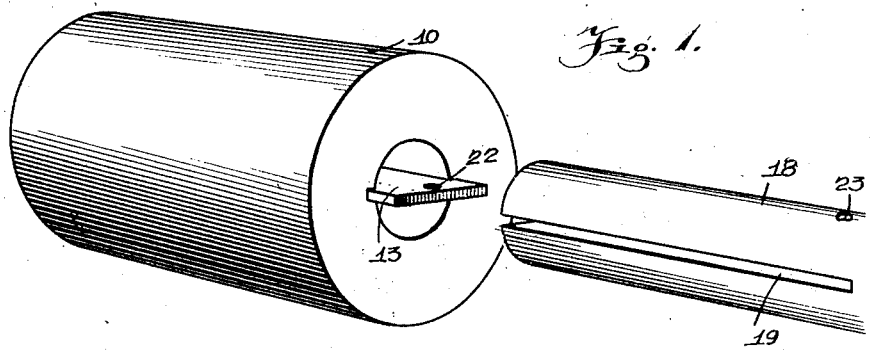
Figure 1 is a perspective view of certain of the parts providing my improved construction.

It is to be noted that the drawings illustrate all of the parts somewhat diagrammatically, with a view of showing my invention with a maximum of simplicity, and in these drawings the reference numeral 10 indicates the billet receiving chamber formed with a bore 11, which latter is adapted to receive the billets.

These billets, contrary to the conventional construction, have included a pair of separate body portions 12, semi-circular in cross section, one of which has been illustrated in Fig. 6. By providing the billets in this shape, it will be noted that any likelihood of a defective core incident to the use of a circular billet, is avoided.

A partition 13 is arranged within the bore of the billet receiving chamber 10, it being noted that the same conveniently rests in grooves formed at diametrically opposite points in the face of the bore 11, which grooves terminate in shoulders 14, against which the inner end of the partition 13 is adapted to abut to prevent any longitudinal movement of the same within the billet receiving chamber.

The partition 13, as will be noted, has its outer end conveniently extending beyond the billet receiving chamber, for a purpose hereinafter more fully specified, and it is to be noted that studs 15 are secured to the inner end of the partition 13, and these studs extend through die openings in the die 16, secured to the billet receiving chamber, by any suitable means such as bolts 17, and adjacent one end of the bore 11.

Figure 2:
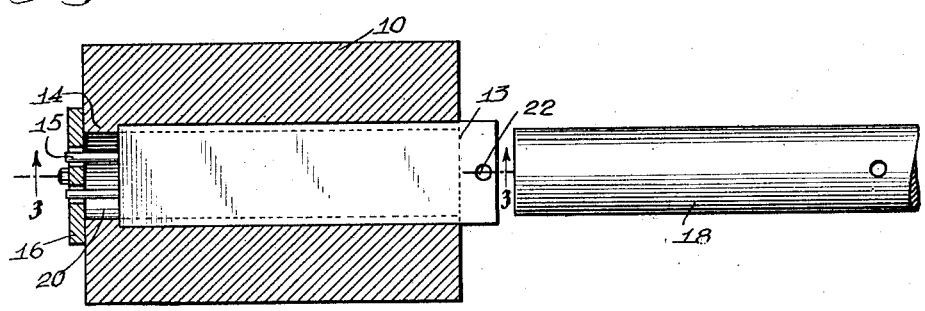
Fig. 2 is a sectional plan view of the same.
Figure 3:
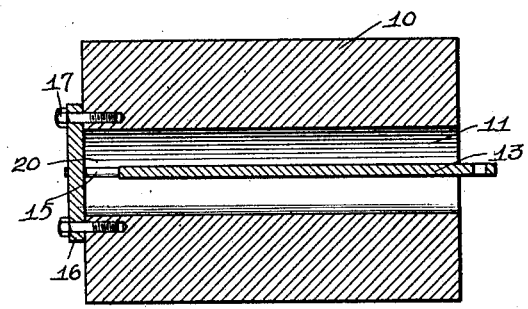
Fig. 3 is a sectional side view of certain of the parts.

It will now be seen that billets of the type illustrated in Fig. 6, are arranged above and below the partition 13 within the bore 11, the parts being in the position illustrated in Figs. 1, 2 and 3. The ram 18 in line with the bore 11 is now projected, it being noted that the ram is conveniently formed with a longitudinally extending slot 19 permitting the same to ride past the partition 13.

The billets will now be flush against the die 16, and by virtue of the space existent between the inner end of the partition 13, and the die, the units of the billet will be caused to blend one into the other in the chamber 20 thus provided. Thus a structure is furnished, which will avoid any objection with regard to the finished tube in that seams appear upon the same due to the utilization of a billet comprising a plurality of units formed by the introduction of this billet into the die as separate units.

The metal will now be extruded in the manner shown in Fig. 4 to form tubes 21, this resulting, due to the spacing of the studs 15 from the die openings of the die 16. In this connection it is to be noted that the billet section extending upon the partition in Fig. 4, has been eliminated so as to clearly illustrate the over-riding of the ram over the partition 13. Upon the ram reaching the completion of its extruding stroke, i. e., the end of the same coming in line with the inner end of the partition, the die 16 is preferably removed, and the ram further projected to remove all of the metal from the chamber 20, which metal may subsequently be scrapped.

It will be appreciated that the partition will most likely have "frozen" within the billet receiving chamber, after the completion of the billet receiving stroke, and with a view which will provide of ready means for the removal of this partition, it will be noted that the extended portion of the partition aforedescribed, is conveniently provided with an opening 22, which opening is adapted to aline with an opening 23 in the ram 18 upon the latter completing its projecting stroke. A pin 24 may now be projected through the alining openings 22 and 23 so that a retraction of the partition 13 may be effected, upon the ram 18 being withdrawn from within the bore 11.

Thus I have provided a structure permitting of an extrusion of tubes, and particularly applicable for delicate work in which the tubes are of a small diameter, but obviously not limited to this adaption, and by means of which structure the thickness of the side walls of the tubes will be at all times even, such tubes presenting a perfect body portion free from all seams, and defects, by virtue of the utilization of a non-circular billet, and the improved structure permitting of the utilization of a billet of this type.

Also any of the adhering particles of the billets are effectively removed from within the bore 11, and aside from this the partition may readily be withdrawn by means of the structure illustrated.

Obviously numerous modifications of structure might readily be resorted to without in the least departing from the spirit of my invention, and what I claim is:

1. Means for making tubes, including a billet receiving chamber, a ram adapted to be introduced into one end of said chamber, a die secured to the opposite end thereof, and means attached within said billet chamber and coöperating with said die for extruding tubes upon said ram being brought to bear against the billets within said chamber.

2. Means for extruding tubes, comprising a member including a billet receiving bore, a ram adapted to be introduced into one end of said bore, a die positioned adjacent the opposite end thereof, and a partition arranged within said bore.

3. Means for extruding tubes, comprising a member including a billet receiving bore, a ram adapted to be introduced into one end of said bore, a die positioned adjacent the opposite end thereof, and a partition arranged within said bore, said partition having its inner end spaced from the inner end of said die.

4. Means for extruding tubes, comprising a member including a billet receiving bore, a ram adapted to be introduced into one end of said bore, a die positioned adjacent the opposite end thereof, and a partition arranged within said bore, and studs forming a continuation of the inner end of said partition, said studs being adapted to extend within, and be spaced from die openings forming a part of said die.

5. Means for extruding tubes, comprising a member including a billet receiving bore, a ram adapted to be introduced into one end of said bore, a die positioned adjacent the opposite end thereof, and a partition arranged within said bore, the inner end of said partition being spaced from the inner face of said die whereby to provide a chamber within said bore attached to the inner end of said partition, and extending through said chamber, and into openings forming a part of said die.

6. Means for extruding tubes, comprising a member including a billet receiving bore, a ram adapted to be introduced into one end of said bore, a die positioned adjacent the opposite end thereof, and a partition arranged within said bore, said ram being formed with a longitudinally extending slot into which said partition is adapted to extend when said ram is projected.

7. Means for extruding tubes, comprising a member including a billet receiving bore, a ram adapted to be introduced into one end of said bore, a die positioned adjacent the opposite end thereof, and a partition arranged within said bore, said partition having its inner end spaced from the inner end of said die, said ram being formed with a longitudinally extending slot into which said partition is adapted to extend when said ram is projected, the slot of said ram being of a length sufficient to permit the end of said ram to move to a point adjacent the inner face of the die.

8. Means for extruding tubes, comprising a member including a billet receiving bore, a ram adapted to be introduced into one end of said bore, a die positioned adjacent the opposite end thereof, and a partition arranged within said bore, said ram being formed with a longitudinally extending slot into which said partition is adapted to extend when said ram is projected, said partition and ram being formed with openings adapted to aline with each other when said ram is projected, said openings receiving means adapted to prevent movement of said ram with respect to the partition, whereby a withdrawal of the latter may be effected from within the bore.

9. Means for extruding tubes, comprising a member including a billet receiving chamber, said billet receiving chamber being formed with grooves at diametrically opposite points in its face, and a partition arranged within said grooves and extending across said chamber.

10. Means for extruding tubes, comprising a member including a billet receiving chamber, said billet receiving chamber being formed with grooves at diametrically opposite points in its face, and a partition arranged within said grooves and extending across said chamber, said grooves terminating in shoulders at a point short of one of the ends of said billet receiving chamber whereby to prevent any inward motion of said partition.

RAY WALTER LOWE.